(12) United States Patent
Appleton et al.

(10) Patent No.: US 6,197,227 B1
(45) Date of Patent: Mar. 6, 2001

(54) TORIC AXIS ALIGNMENT MACHINE AND METHOD

(75) Inventors: William John Appleton, Rochester; Kevin Jacob DeRyke, Webster; Michael Henry Dobner, Penfield; Allen Lee Ormiston, Fairport; Ian Andrew Powell, Honeoye Falls, all of NY (US); Jeffrey Michael Vandewinckel, Chesapeake, VA (US)

(73) Assignee: Bausch & Lomb Incorporated, Rochester, NY (US)

(*) Notice: Subject to any disclaimer, the term of this patent is extended or adjusted under 35 U.S.C. 154(b) by 0 days.

(21) Appl. No.: 09/228,858

(22) Filed: Jan. 12, 1999

Related U.S. Application Data

(60) Provisional application No. 60/071,617, filed on Jan. 16, 1998.

(51) Int. Cl.$^7$ ...................................................... B29D 11/00
(52) U.S. Cl. ........................... 264/1.1; 264/2.5; 264/40.5; 425/150; 425/449; 425/452; 425/808
(58) Field of Search .................................. 264/1.1, 2.1, 2.5, 264/40.5; 425/808, 138, 150, 177, 449, 452, 453, 454

(56) References Cited

U.S. PATENT DOCUMENTS

| | | |
|---|---|---|
| 3,632,696 | 1/1972 | Jones . |
| 3,946,982 | 3/1976 | Calkins .................. 249/102 |
| 4,208,364 | 6/1980 | Shepherd . |
| 4,208,365 | 6/1980 | LeFevre . |
| 4,307,046 | 12/1981 | Neefe . |
| 4,383,672 | 5/1983 | Kreuttner .................. 249/134 |
| 4,407,766 | 10/1983 | Haardt ...................... 264/2.2 |
| 4,422,984 | 12/1983 | Neefe ...................... 264/2.1 |
| 4,469,646 | 9/1984 | Rawlings .................. 264/2.2 |
| 4,522,768 | 6/1985 | Roscrow .................. 264/2.2 |
| 4,555,372 | 11/1985 | Kunzler .................... 264/2.1 |
| 4,636,338 | 1/1987 | Neefe ...................... 264/2.1 |
| 4,680,998 | 7/1987 | Council . |
| 4,693,446 | 9/1987 | Orlosky ................... 249/53 R |
| 4,749,530 | 6/1988 | Kunzler ..................... 264/2.7 |
| 4,781,452 | 11/1988 | Ace ........................... 351/177 |
| 4,786,444 | 11/1988 | Hwang . |
| 4,980,993 | 1/1991 | Umezaki ................. 51/165.71 |
| 5,066,431 | 11/1991 | Briggs ...................... 264/2.1 |
| 5,076,683 | 12/1991 | Glick ...................... 351/160 H |
| 5,110,278 | 5/1992 | Tait ........................... 425/175 |
| 5,147,585 | 9/1992 | Blum . |
| 5,200,121 | 4/1993 | Hagmann ................. 264/1.8 |
| 5,244,377 | 9/1993 | Danker .................... 425/542 |
| 5,252,056 | 10/1993 | Horner ..................... 425/555 |
| 5,269,105 | 12/1993 | Fleenor .................... 51/281 R |
| 5,271,875 | 12/1993 | Appleton .................. 264/2.3 |
| 5,288,221 | * 2/1994 | Stoerr et al. ............. 425/808 |
| 5,300,262 | 4/1994 | Glick ...................... 264/2.1 |
| 5,330,203 | 7/1994 | Fleenor .................... 279/46.3 |
| 5,456,864 | 10/1995 | Wickes ..................... 264/2.5 |
| 5,517,259 | 5/1996 | Blum ....................... 351/160 R |
| 5,528,321 | 6/1996 | Blum ....................... 351/160 R |
| 5,598,234 | 1/1997 | Blum ....................... 351/160 R |
| 5,611,970 | 3/1997 | Apollonio ................ 264/2.5 |
| 5,620,717 | 4/1997 | Wickes ..................... 425/175 |
| 5,916,494 | * 6/1999 | Widman et al. ........... 264/1.1 |

FOREIGN PATENT DOCUMENTS

| | | |
|---|---|---|
| 2356911 | 5/1975 | (DE) . |
| 0691195A2 | 1/1996 | (EP) . |
| 0788871A2 | 8/1997 | (EP) . |
| 1374881 | 4/1964 | (FR) . |
| 59-78818 | 5/1984 | (JP) . |

* cited by examiner

*Primary Examiner*—Mathieu D. Vargot
(74) *Attorney, Agent, or Firm*—Katherine McGuire

(57) ABSTRACT

A method and apparatus for practicing the method of making toric contact lenses having a toric axis and ballast axis located on the anterior and posterior surfaces of a lens. Detectable features are formed on the anterior and posterior mold sections corresponding to the location of the toric axis and ballast axis, respectively. An axis alignment tool having detecting means thereon is used to set the mold sections to a known angular position. The desired axial offset is input into a computer which establishes the axial offset between the mold sections.

18 Claims, 15 Drawing Sheets

TORIC AXIS ALIGNMENT MACHINE AND METHOD

This application claims benefit of Provisional Application Ser. No. 60/071,617 filed Jan. 16, 1998.

BACKGROUND OF THE INVENTION

The present invention generally relates to contact lens manufacturing. More particularly, the invention relates to a machine and method for manufacturing molded toric contact lenses.

A method of cast molding toric contact lenses is described in U.S. Pat. No. 5,611,970 issued Mar. 18, 1997 to Bausch & Lomb Incorporated, assignee herein, the entire disclosure of which is incorporated herein by reference. The method of the '970 patent involves providing anterior and posterior mold sections having concave and convex molding surfaces, respectively, which are placed together to form a lens-shaped mold cavity into which a monomer is deposited and cured to form a lens. The invention of the '970 patent places a ballast-forming feature on the anterior mold section and a toric-forming feature on the posterior mold section, with the anterior and posterior mold sections being alignable at multiple rotational positions. The mold sections themselves are injection molded using special optical tools which replicate the anterior and posterior mold surfaces on the respective mold sections which, in turn, form the optical anterior and posterior surfaces of the resultant lens. Although each mold section is used only once to make a single lens, by placing the ballast and toric features on the opposite mold sections, which may be aligned at any selected one of multiple rotational positions, a plurality of toric contact lenses may be formed, each having different rotational offsets between the ballast and toric features of the lens, by mold sections which are formed from the same optical mold tools. Although the '970 patent at Col. 5, lns. 6–16 suggests ensuring the selected rotational alignment between the mold sections by engaging a notch of the anterior mold section and rotating it on a support relative to indicia on the posterior mold section, there is no discussion of automated manufacturing or handling processes by which this may be carried out.

SUMMARY OF THE INVENTION

The present invention compliments the method of the '970 patent by providing a machine and method by which the rotational offset between the ballast and toric features of anterior and posterior mold sections may be automatically selected and passed through a full production cycle to form toric lenses of any desired rotational offset. Other than the inputting of the desired rotational offsets, the inventive machine and method requires very little operator intervention.

More particularly, the automated machinery of the invention is connected to and operated by a computer which is programmed to control the operation of the machine. The operator simply chooses and inputs the desired rotational offset between the anterior and posterior mold sections which is then transmitted to the appropriate machine parts which control the rotational alignment of the mold sections. The anterior and posterior mold sections are delivered to the machine via a pair of tubes in which the anterior and posterior mold sections are placed in stacked relation, respectively. The tubes are vertically oriented with respect to the machine with the mold sections being delivered through an opening in the bottom of the tube, one at a time. A glider plate is positioned directly beneath the vertically oriented tubes and is configured to receive a posterior and anterior mold section thereon. In the preferred embodiment of the invention, three pairs of mold sets are passed through a production cycle at a time.

The glider plate transports and deposits the posterior mold section at a predetermined position within the machine. A posterior mold handling rod is lowered over the posterior mold section and lifts the posterior mold section vertically upward. The glider plate then transports and deposits the anterior mold section onto the top end surface of the anterior mold handling rod, with the anterior and posterior rods being in axial alignment. An axis alignment tool is then moved to a location between the posterior and anterior mold sections, with the posterior mold-handling rod then lowered and engaging the posterior mold section with the upper-most portion of the axis alignment tool, and the anterior mold-handling rod rising vertically until the anterior mold section is engaged with the lower-most portion of the axis alignment tool.

The upper and lower halves of the axis alignment tool are each provided with an element which cooperatively engages with an element provided on each of the posterior and anterior mold sections, respectively. With the posterior and anterior mold sections engaged in the upper and lower halves of the axis alignment tool, the posterior and anterior rods are rotated about their common vertical axis until the cooperative elements on the mold sections engage with the elements on the stationary axis locator tool. The elements on the mold sections are formed thereon at the time the molds are injection molded, with the positions of the elements on the mold sections being predetermined and selected relative to the toric and ballast features on the optical surfaces of the mold sections. Thus, with these relative positions between the toric and ballast features and their respective mold aligning elements being known, the posterior and anterior rods may be rotated with respect to the stationary axis alignment tool until the toric and ballast features of the posterior and anterior mold sections are set to a 0°, or other known angular "home" position, respectively.

With the posterior and anterior mold sections at their "home" positions, the posterior and anterior rods, together with the posterior and anterior mold sections, are lifted and lowered, respectively, thereby disengaging the mold sections from the axis alignment tool which is then retracted to a position which is laterally spaced from the posterior and anterior mold handling rods. The anterior mold handling rod and anterior mold section are rotated according to the desired axial offset which was programmed into the computer, relative to the stationary posterior mold handling rod and mold section. This establishes the desired axial offset between the toric and ballast features of the yet unfinished lens. A measured quantity of liquid monomer is then injected into the anterior mold section, and the posterior mold rod with posterior mold section is moved toward the anterior mold section until the posterior mold section engages the anterior mold section with a predetermined clamping pressure. The posterior mold handling rod is then retracted, leaving the posterior mold section capped to the anterior mold section. The mold sections can then be moved to a location for curing of the monomer into a lens.

DETAILED DESCRIPTION

Figure 9:
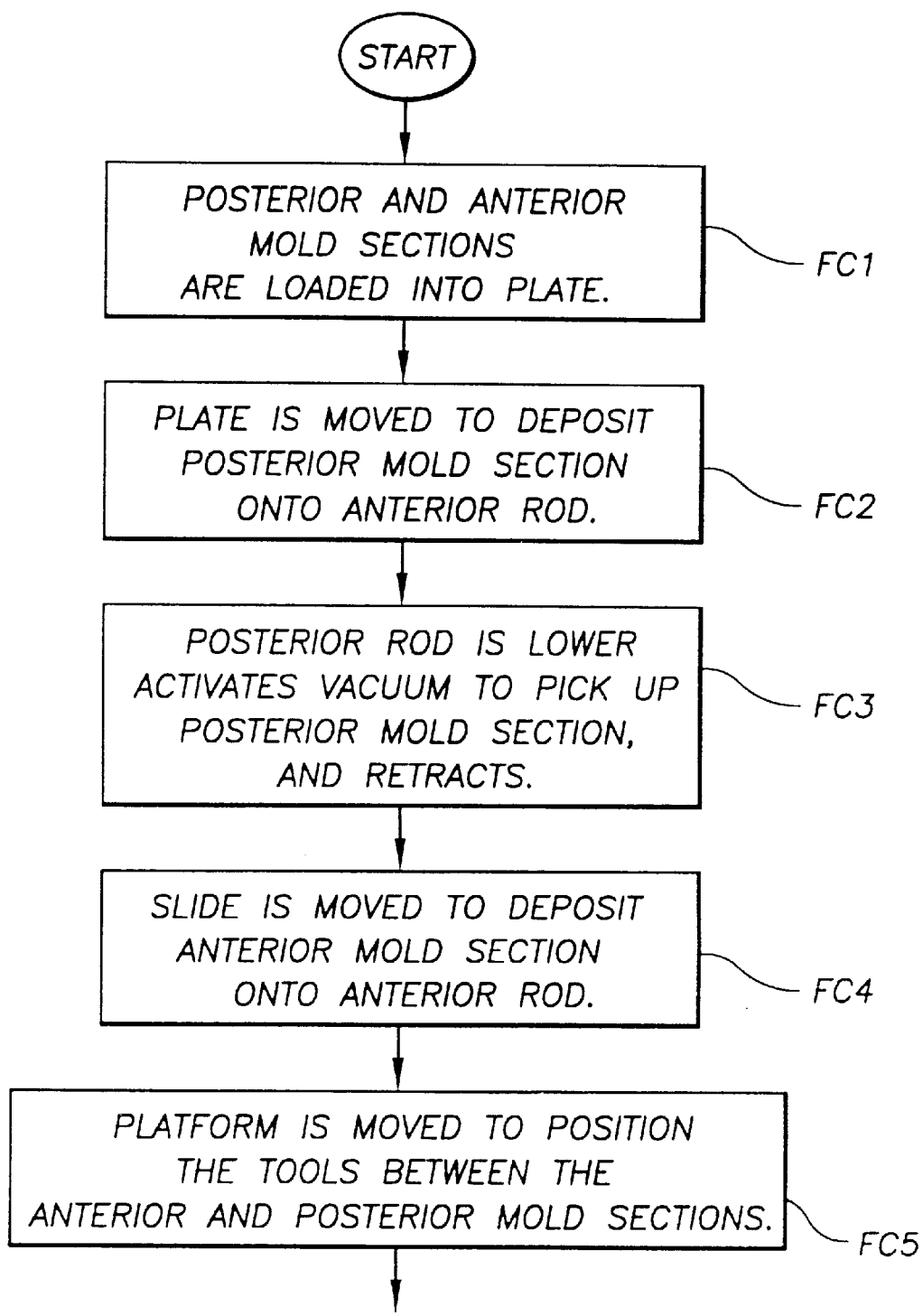
FIGS. 9–11 illustrate a flow chart describing the various stages of movement of the machine through a single production cycle.
Figure 10:
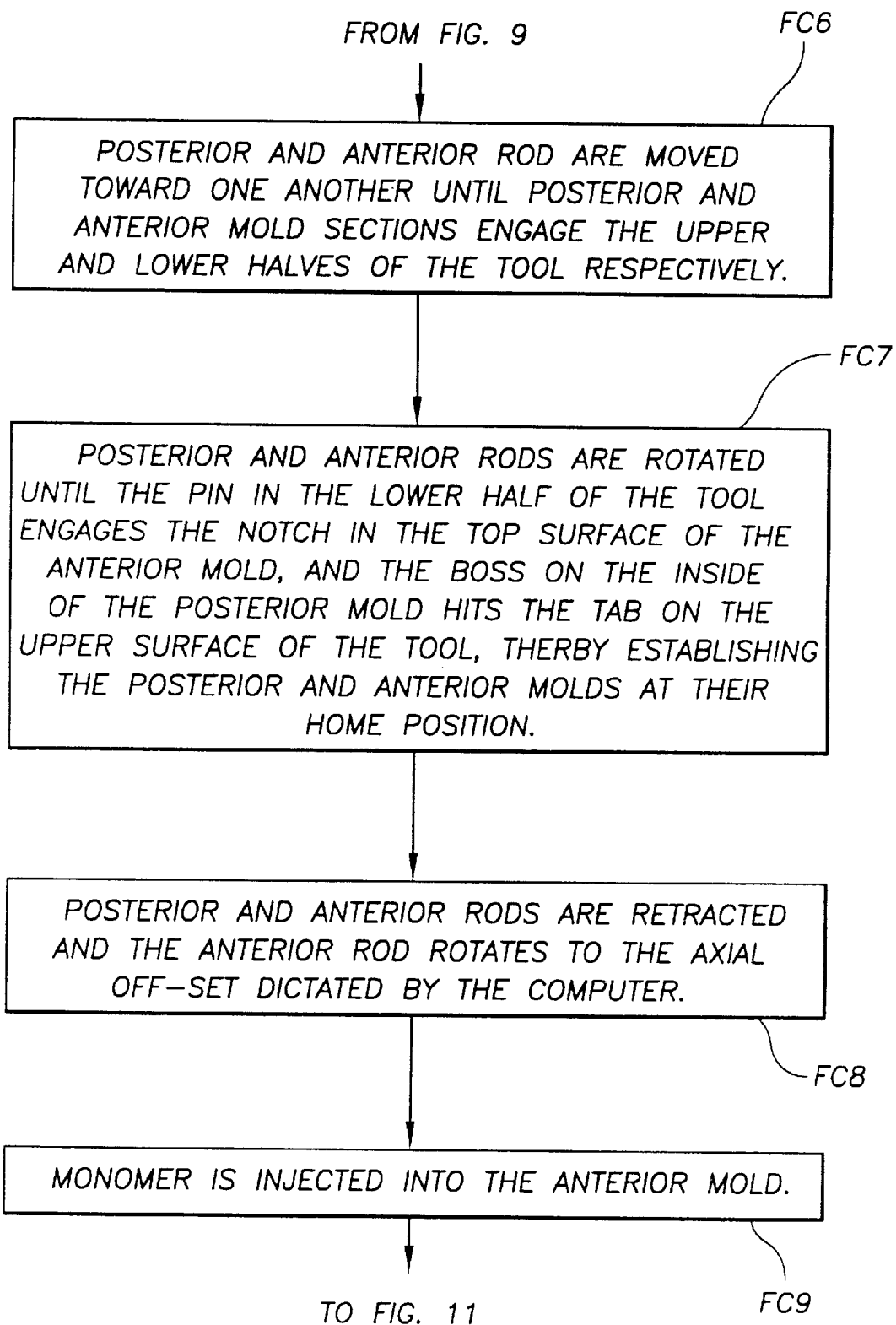
Figure 11:
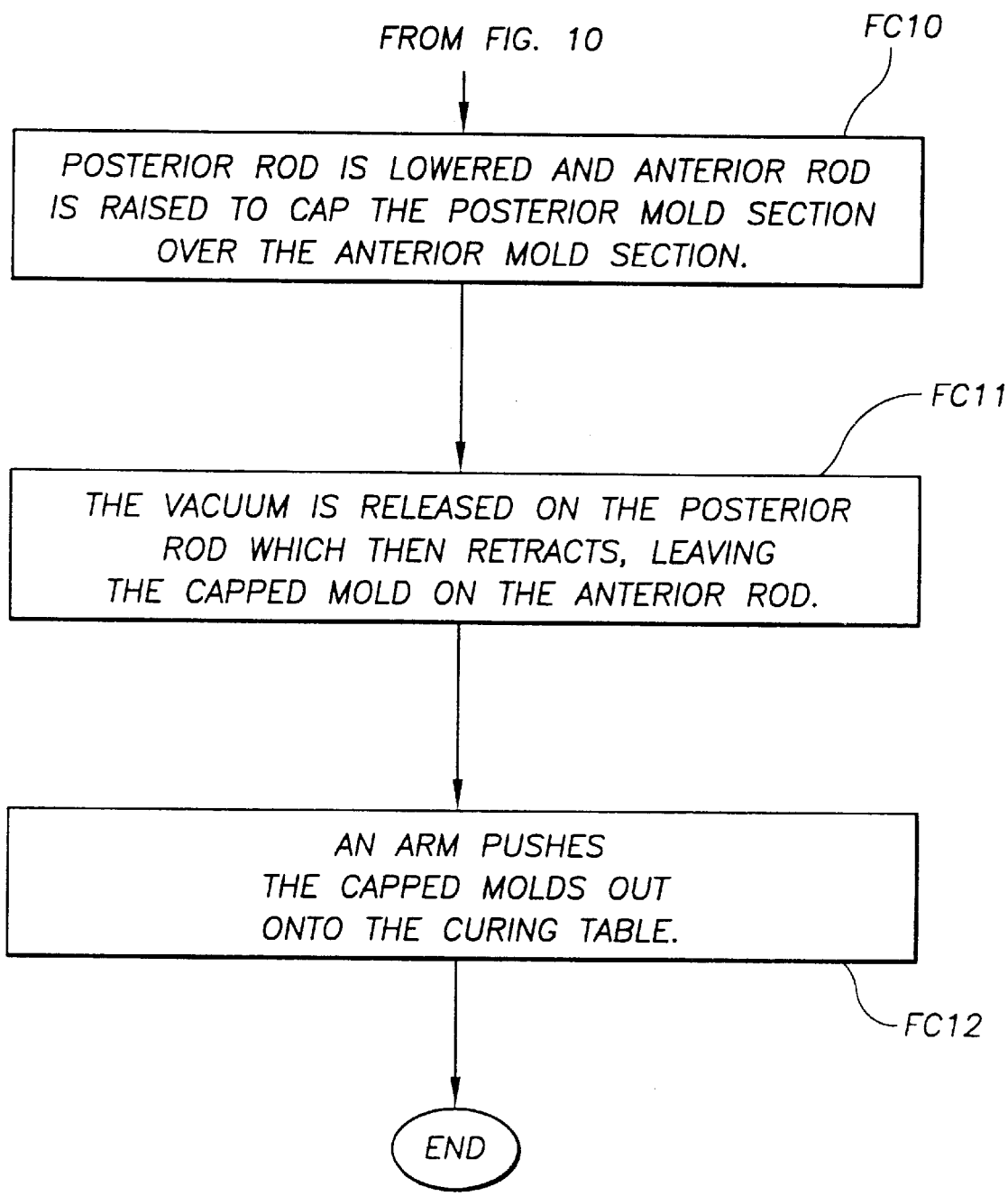
Figure 13:
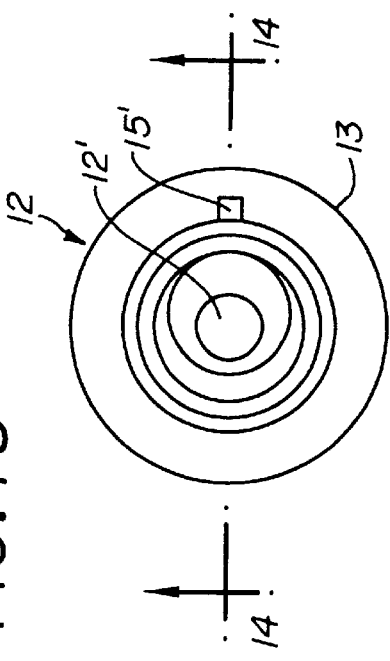
FIG. 13 is a top plan view of FIG. 12.

The inventive machine 10 and individual components thereof are seen in FIGS. 1–8 and 20–24. An anterior and posterior mold section pair 12,14, respectively, is shown in FIGS. 12–18 which is used for making a toric contact lens 16 as seen in FIG. 19 using machine 10. A flow diagram describing the various stages of a production cycle of machine 10 is shown in FIGS. 9–11.

Machine 10 is operable to manufacture toric contact lenses having any desired axial offset between the toric and ballast features formed on the opposite optical surfaces of a toric contact lens. Referring to FIG. 19, toric lens 16 illustrates a representative toric contact lens which may be made in accordance with the machine and method of the present invention. Central zone 18 of posterior surface 20 is toric, i.e., this zone has a toric surface that provides the desired cylindrical correction for an astigmatic cornea Posterior surface 20 may optionally include at least one peripheral curve 22 surrounding the toric central zone 18. For the described embodiment, central zone 24 of anterior surface 26 is spherical, and the spherical curve is matched with central zone 18 to provide the desired spherical correction to the lens. Anterior surface 26 may optionally include at least one peripheral curve 28 surrounding central zone 24.

Lens 16 is provided with ballast so that the lens maintains a desired rotational orientation on the eye. For example, as schematically shown in FIG. 19, peripheral section 30 may have a different thickness than opposed peripheral section 32 of the lens periphery. As is known in the art, the ballast is oriented about an axis, and toric contact lens prescriptions define the offset of this ballast axis from the cylindrical axis by a selected rotational angle (usually expressed as number of degrees). As used herein, the term "offset" is inclusive of angles of 0 degrees through 180 degrees, wherein the cylindrical axis is coincident with the ballast axis.

Figure 20:
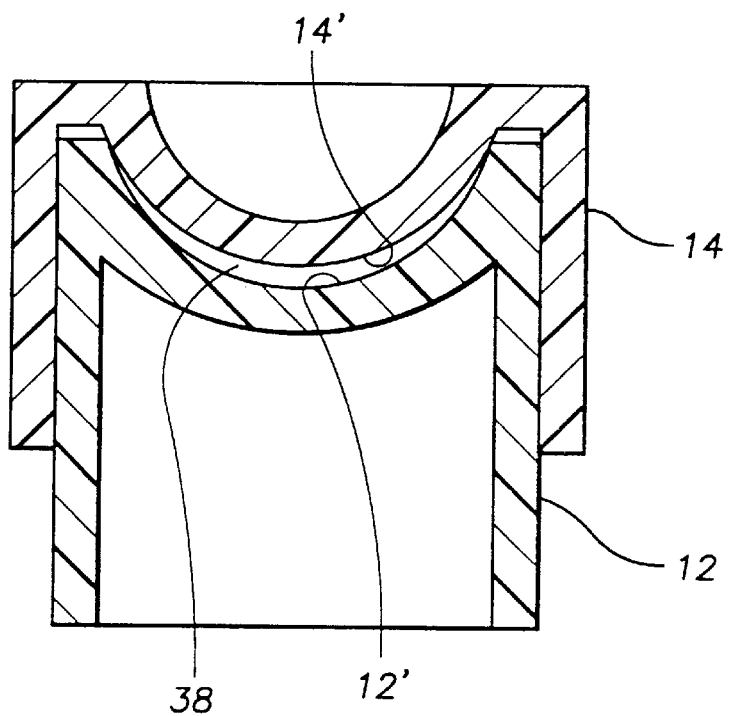
FIG. 20 is a schematic cross-sectional view of an assembled mold.

Anterior and posterior mold sections 12,14 are each formed by a known injection molding process using a respective pair of optical tools (not shown) which form the mold optical surfaces 12',14' into the mold sections 12,14, respectively, with the anterior mold concave surface 12' ultimately forming the anterior (outer-away from the eye) surface 26 of the toric lens 16, and the posterior mold convex surface 14' ultimately forming the posterior (inner-against the eye) surface 20 of the toric lens 16. When the anterior and posterior mold sections 12,14 are brought together as seen in FIG. 20, a mold cavity 38 is formed between facing mold surfaces 12',14' which corresponds to the shape of the contact lens molded therein. Accordingly, in accordance with the present invention, posterior mold convex surface 14' has a toric central curve zone having a cylindrical axis (for forming the toric posterior surface 20 of lens 16), and anterior mold concave surface 12' has a configuration that will provide ballast to a lens molded in molding cavity 38. Of course, surfaces 12',14' may also include curves for forming desired peripheral curves on the lens, and the central zones of surfaces 12',14' may be designed to provide a desired spherical correction to the molded toric contact lens.

As discussed above, a toric lens prescription defines the axial offset between the toric axis and ballast axis of the posterior and anterior surfaces 20,26 of the lens, respectively. Different toric prescriptions thus have different axial offsets between these parameters. Machine 10 is operable for selecting and manufacturing toric lenses having the desired axial offset using mold sections 12,14. Furthermore, the axial offset is easily changed between production cycles whereby the same machine 10 is capable of making toric lenses of many different axial offsets/prescriptions. Such a machine has not heretofore existed.

Referring to FIGS. 1–8, machine 10 includes a main housing 40 supported on multiple legs 42. Housing 40 is a generally rectangular structure including bottom and top walls 44,46 and opposite side wall pairs 48,50 and 52,54, respectively, all defining an internal space 56. Housing configurations other than rectangular are of course possible. Housing 40 is preferably fully enclosed to maintain an oxygen-free atmosphere of nitrogen, and to protect and reduce accumulation of dust on the various components held within the housing, although selected portions of housing 40 are preferably easily removable to provide access to space 56 and the components held therein, as needed.

A pair of anterior and posterior mold supply tubes 58,60, respectively, are positioned vertically through openings formed in top wall 46 of housing 40. The top ends 58',60' of the supply tubes 58,60 are open and wherein the anterior and posterior mold sections 12,14 are individually deposited and stacked, respectively. During operation of machine 10, it is intended that the anterior and posterior supply tubes 58,60 be continuously stocked with anterior and posterior mold sections 12,14, respectively.

A first movable glider plate 62 is positioned within housing 40 over a support plate 64. A first ram 66 attaches to the back edge 62' of plate 62, whereby ram 66 and plate 62 are movable between a "home" position $S_1$ seen in FIGS. 1, 2 and 6–8, an intermediate position $S_2$ seen in FIG. 3, and a fully extended position $S_3$ seen in FIGS. 4 and 5. As seen best in FIGS. 2A and 2B, plate 62 includes three notched areas which are each configured with a pair of rounded openings 62a,b; 62c,d; and 62e,62f, the openings of each pair adapted to removably receive an anterior and posterior mold section 12,14 therein, respectively. When plate 62 is in the "home" position of FIGS. 1,2 and 6–8, an anterior and a posterior mold section 12,14 drop freely from tubes 58,60 into the rounded openings 62a,b; 62c,d; and 62e,f of plate 62, respectively. In this regard, it is noted that machine 10 is adapted to manufacture three toric lenses simultaneously; hence, a total of three pair of supply tubes 58,60 are provided for depositing three pair of anterior and posterior mold sections 12,14 into the three pair of rounded openings of plate 62 at a time. Although the invention is described herein in an embodiment which manufactures three toric contact lenses at a time, it will be understood that machine 10 may be modified to manufacture anywhere from one toric lens to a potentially infinite number of toric lenses at a time, as desired. This first step in the production cycle is labeled FC1 in FIG. 9.

With an anterior and posterior mold section pair 12,14 having been deposited into opening pairs 62a,b; 62c,d; and 62e,62f, respectively, an anterior mold section 12 is located in each of the rear openings 62a, 62c, and 62e, while a posterior mold section 14 is located in each of the forward openings 62b, 62d and 62f located adjacent forward edge 62" of plate 62. Once the mold sections 12,14 are nested inside a respective plate opening, ram 66 is activated to extend itself and plate 62 to the left until plate 62 reaches a second stop position $S_2$ seen in FIG. 3. In second stop position $S_2$, each forward opening 62b, 62d, and 62f of plate 62 is located directly between a pair of anterior and posterior handling rods 68,70, respectively, which are aligned along a common axis x—x (only one pair of anterior and posterior rods are shown in the drawing for the sake of clarity). The anterior handling rod 68 has a top surface 68' which extends through an opening in housing bottom wall 44, and upon which a respective posterior mold section 14 freely rests in stop position $S_2$ of plate 62. (See also FC2 in FIG. 9).

At this time, posterior handling rod 70 is lowered onto a respective posterior mold section 14 located in openings 62b, 62d, and 62f. A vacuum line V provided axially through posterior rod 70 is activated at this time to secure by suction posterior mold section 14 to the end 70' of each posterior handling rod 70. Once the vacuum is applied, posterior handling rod 70 is raised with the posterior mold section 14 attached thereto by vacuum pressure (FIG. 4) (See also FC3 in FIG. 9).

Figure 4:
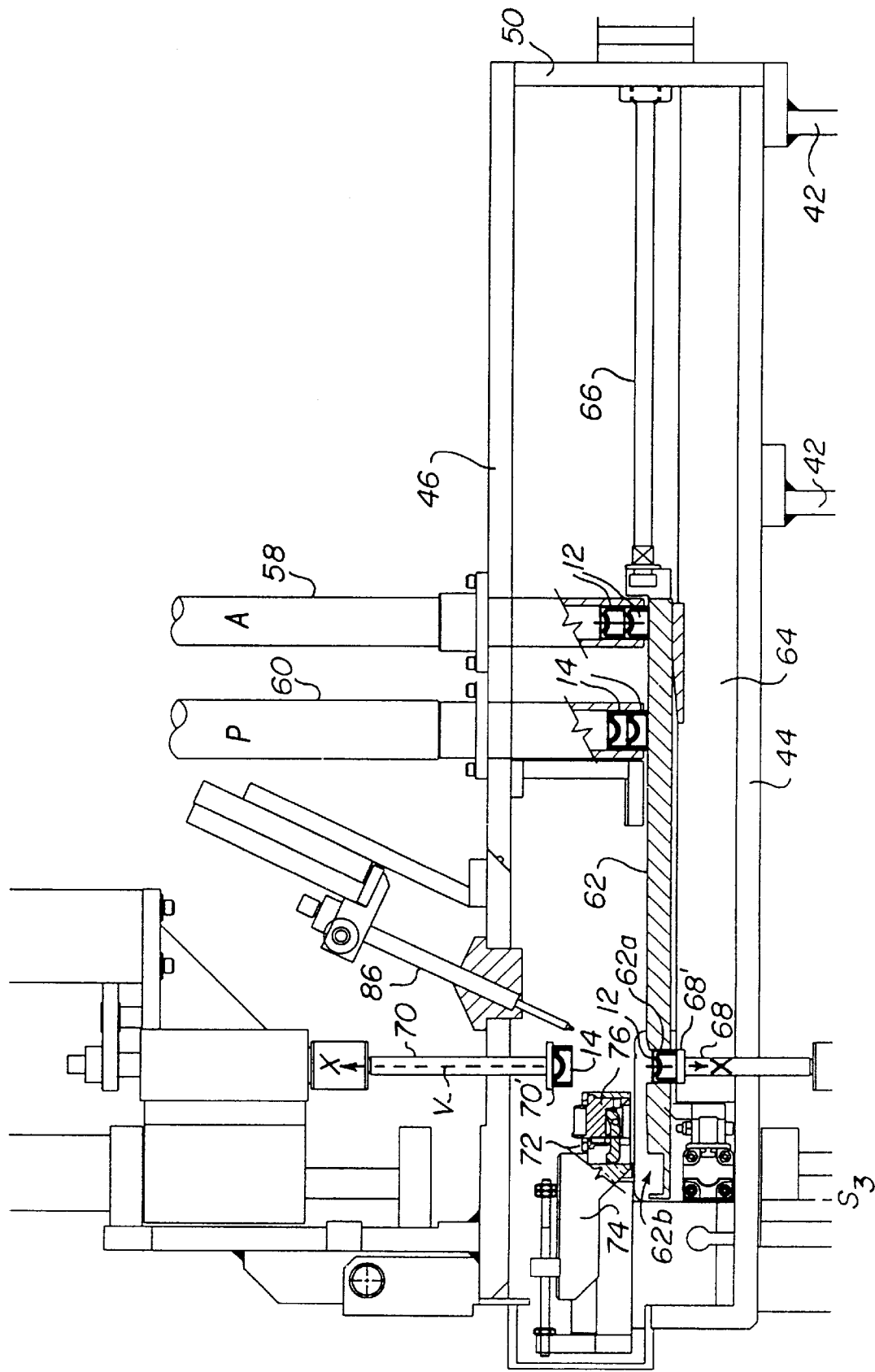
FIG. 4 is a front, elevational view of FIG. 1 showing the machine in a third stage of movement.

With posterior mold sections 14 having been removed from forward openings 62b, 62d and 62f, piston rod 66 extends further to the left until it reaches a third stop position $S_3$ seen in FIG. 4. At third stop position $S_3$, rear openings 62a, 62c and 62e are now located directly between anterior and posterior handling rods 68,70, with forward openings 62b, 62d and 62f being now located to the left thereof. In this position, each anterior mold section 12 rests atop the top surface 68' of a respective anterior handling rod 68. (See also FC4 in FIG. 9).

Figure 5:
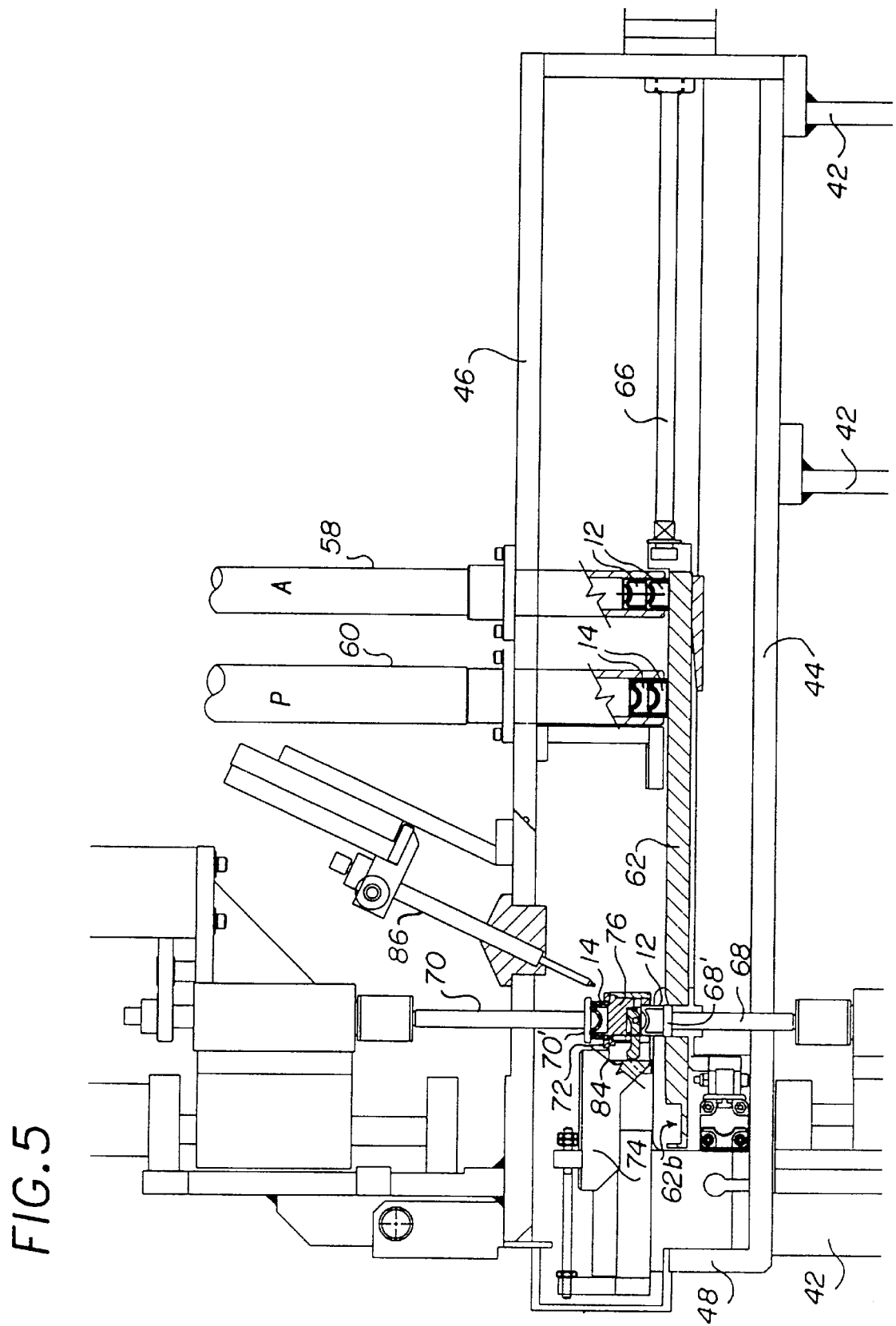
FIG. 5 is a front, elevational view of FIG. 1 showing the machine in a fourth stage of movement.

With posterior handling rods 70 raised and each holding a respective posterior mold section 14, and an anterior mold section 12 resting on surface 68' of each anterior handling rod 68, a second glider plate 72 is moved by an arm 74 to the right to a location between posterior and anterior handling rods 68,70 as seen in FIG. 5. (See FC5 in FIG. 9). As seen best in FIG. 25, glider plate 72 includes three circular openings 72a, 72b and 72c wherein three axis alignment tools 76 are removably positioned, respectively. One such alignment tool 76 is seen in more detail in FIGS. 21–24. The axis alignment tool is used to establish the desired axial offset between the toric and ballast axes of the lens to be molded as described more fully below.

Figure 25:
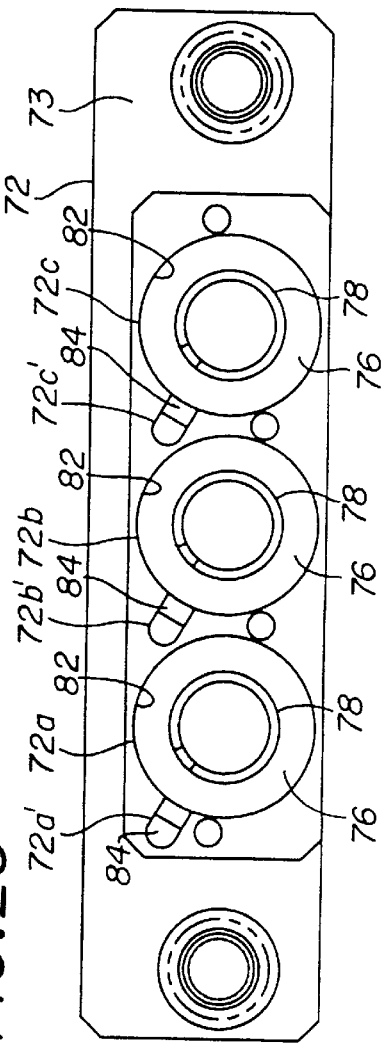
FIG. 25 is a top plan view of three axis alignment tools positioned in a second glider plate.

More particularly, alignment tool 76 is formed of three cylindrical segments including a top segment 78, bottom segment 80 and middle segment 82, each of increasing diameter, respectively. A small lever 84, whose function is explained below, projects radially from bottom section 80. Referring to FIG. 25, the openings 72a–c of plate 72 are each of a diameter only slightly larger than the diameter of the bottom section 80 of each tool 76. Each opening 72a–c further includes a radial section 72a', 72b' and 72c' such that a tool 72 may be fit into each opening with the bottom sections 80 thereof sliding into the circular sections of the openings 72a–c, and the levers 84 of the tools being passed through radial sections 72a', 72b', and 72c' of the openings 72a, 72b and 72c, respectively. Since the diameters of openings 72a–c are only slightly larger than the diameter of bottom sections 80 of tools 76, the middle segments 82 thereof come to rest on the top surface 73 of plate 72 about the perimeters of the openings 72a–c in the fully inserted position of the tools 76 in openings 72a–c. Also, to ensure that each tool 76 is rotationally fixed to plate 72 (for purposes to be explained), the lever hinge pin 84' is keyed into a slot (not shown) in plate 72.

When glider plate 72 is moved to the right to the location seen in FIG. 5 as described above, the openings 72a–c, with tools 76 located therein, are positioned along the axis x—x of a respective pair of anterior and posterior handling rods 68,70. At this time, each pair of anterior and posterior handling rods 68,70 are moved along their common axis x—x toward one another until the anterior mold section 12 carried by anterior handling rod 68 engages the bottom segment 80 of tool 76, and the posterior mold section 14 carried by posterior handling rod 70 engages the top segment 78 of tool 76 (FIG. 5). (See also FC6 in FIG. 10). At this time, anterior and posterior handling rods 68,70 are rotated about their axis x—x to establish each of the toric and ballast axes of mold sections 12,14 at their "home" positions. (See also FC7 in FIG. 10).

Figure 14:
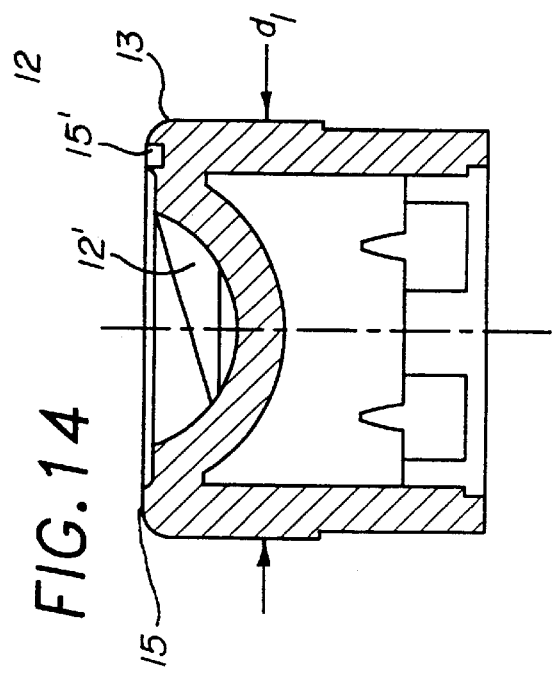
FIG. 14 is a cross-sectional view taken generally along line 14—14 in FIG. 13.
Figure 12:
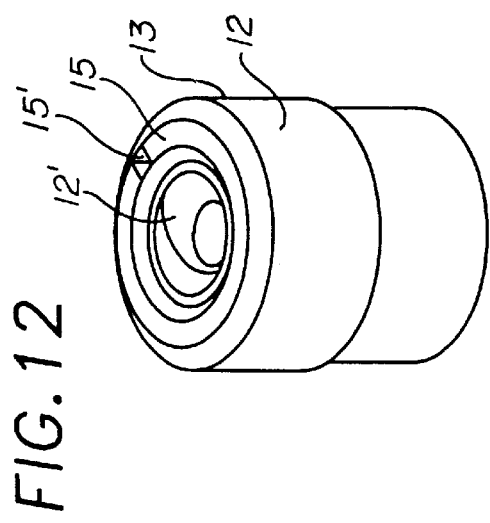
FIG. 12 is a perspective view of an anterior mold section.
Figure 24:
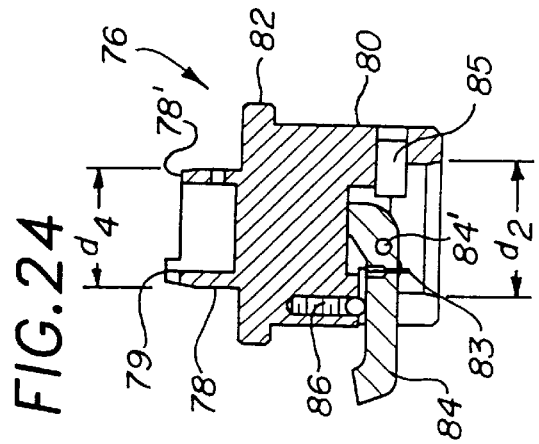
FIG. 24 is a cross-sectional view as taken generally along the line 24—24 in FIG. 23.
Figure 22:
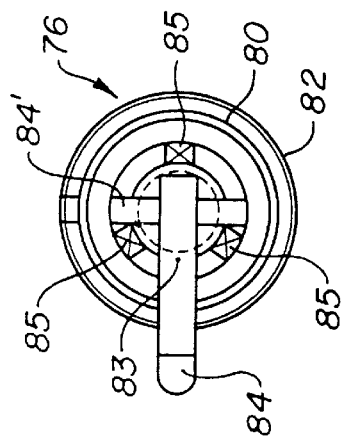
FIG. 22 is a bottom plan view of FIG. 21.

More particularly, as seen in FIG. 5, the anterior mold section 12 is inserted into the open bottom section 80 of tool 76. As seen in FIGS. 14 and 24, anterior mold section 12 has an outer diameter $d_1$ at the upper segment 13 thereof, which diameter $d_1$ is slightly smaller than the inner diameter $d_2$ of bottom segment 80 of tool 76. As such, as the anterior handling rod 68 is raised, the upper segment 13 of anterior mold segment 12 slides into the open bottom section 80 of tool 76. Anterior mold section 12 includes a top surface 15 encircling concave mold surface 12'. As anterior mold section 12 is inserted into tool bottom section 80, anterior mold top surface 15 strikes lever 84 which is biased downwardly by a ball and spring assembly 85. Referring again to FIG. 5, as anterior handling rod 68 continues to rise, top surface 15 pushes lever 84 upwardly (toward upper segment 78 of tool 76) until lever 84 activates a proximity sensor (not shown) positioned adjacent thereto. Activation of the proximity sensor sends a signal informing computer 11 (FIGS. 1 and 2) that anterior and posterior mold sections 12,14 are engaged with axis alignment tool 76.

Figure 18:
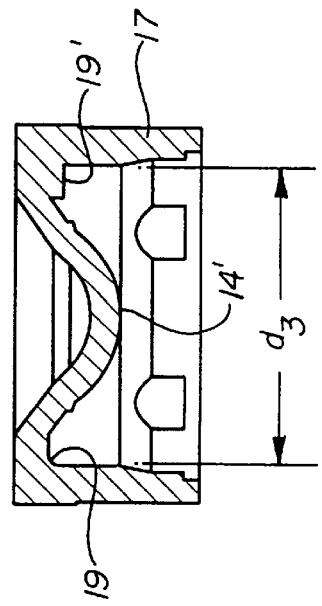
FIG. 18 is a cross-sectional view as taken generally along line 18—18 in FIG. 16.
Figure 15:
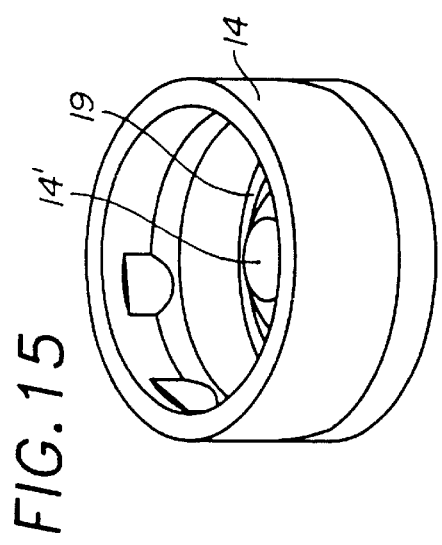
FIG. 15 is a perspective view of a posterior mold section.
Figure 17:
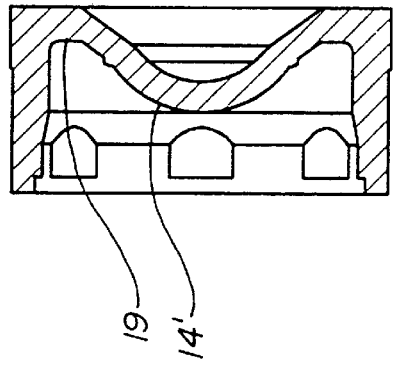
FIG. 17 is a cross-section view as taken generally along line 17—17 in FIG. 16.
Figure 19:
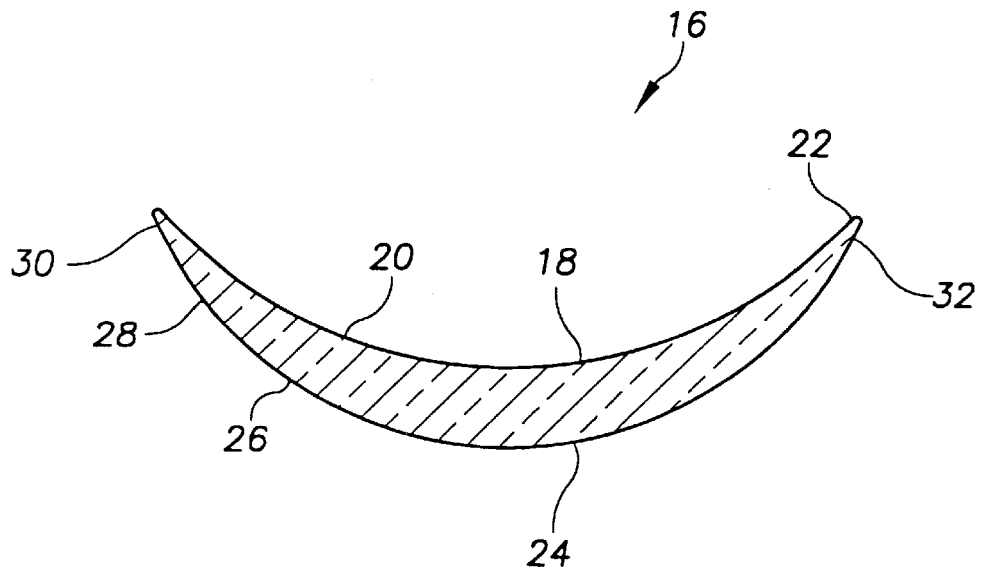
FIG. 19 is a cross-sectional view of a toric contact lens.

Referring to FIGS. 18 and 24, posterior mold section 14 has a minimum inner diameter $d_3$ located adjacent convex mold surface 14' which is slightly larger than tool upper segment 78 outer diameter $d_4$. As such, as posterior handling rod 70 is lowered, the wall 17 of posterior mold section 14 slides over tool upper segment 78.

Figure 1:
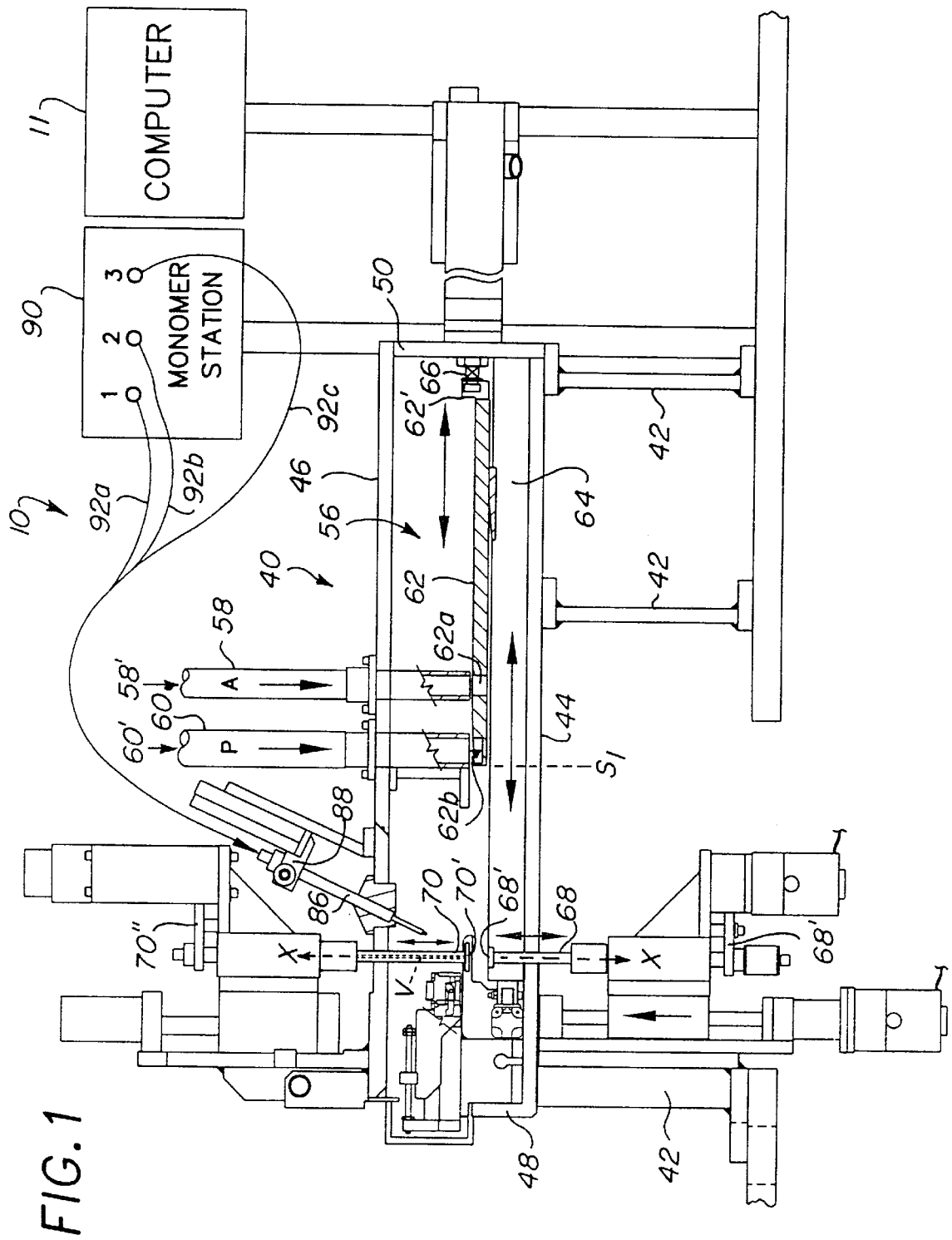
FIG. 1 is a front elevational view of the inventive machine shown in a first "home" position, with some portions thereof broken-away for the sake of clarity.
Figure 2:
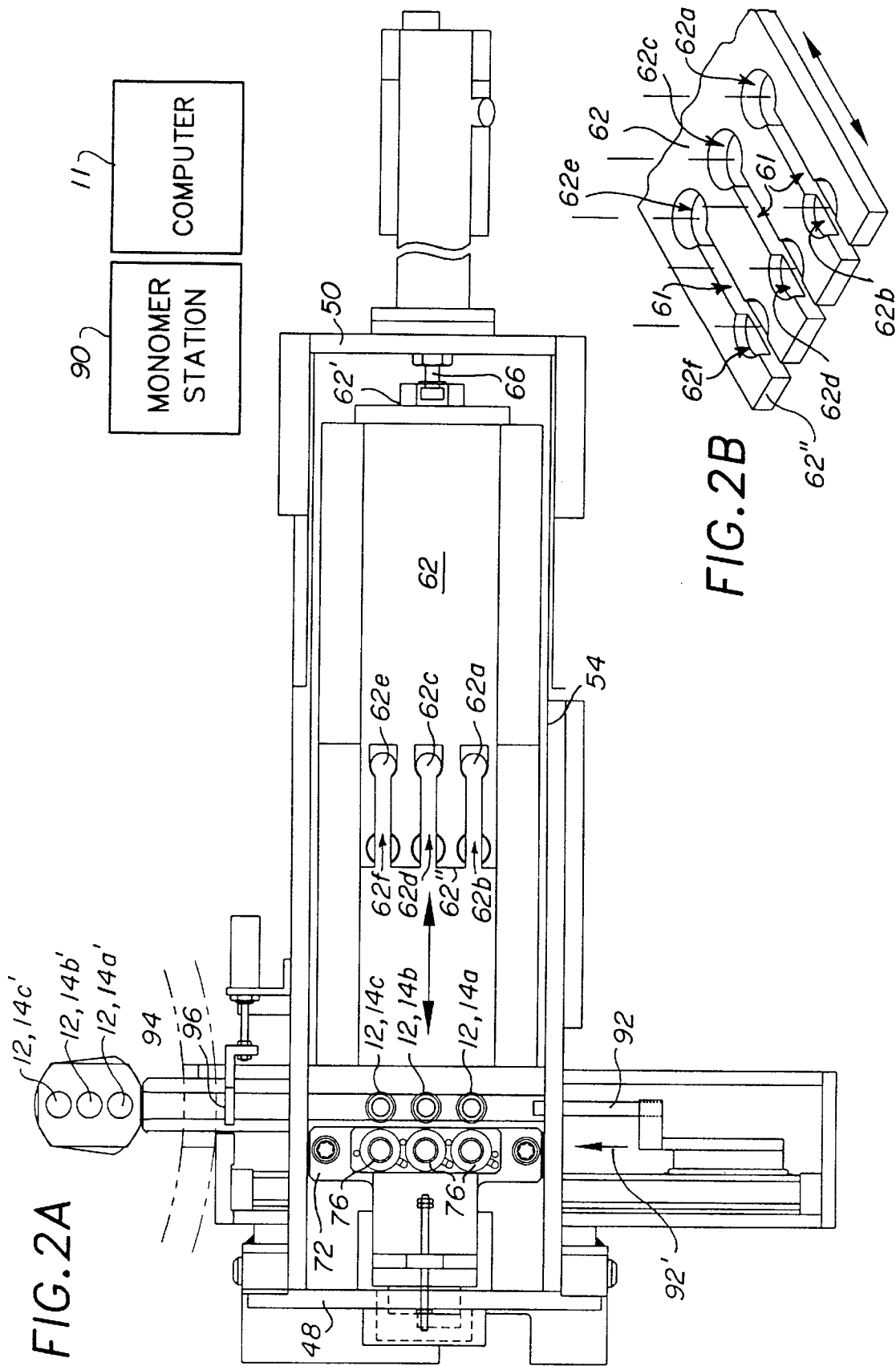
FIG. 2A is a top plan view of FIG. 1.
FIG. 2B is an enlarged, fragmented, perspective view of a first glider plate.
Figure 3:
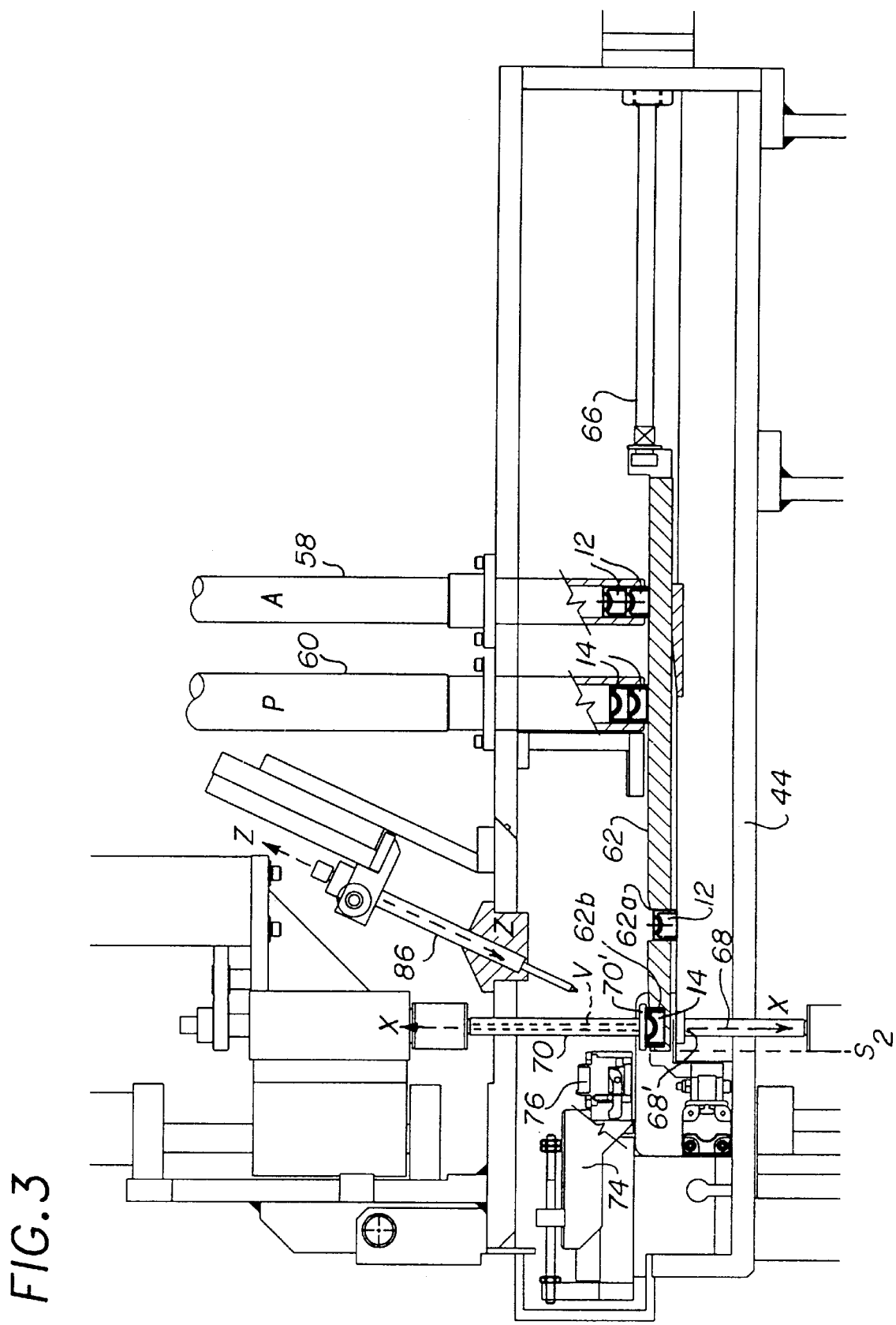
FIG. 3 is a front, elevational view of FIG. 1 showing the machine in a second stage of movement.

As stated above, when anterior mold top surface 15 strikes and depresses lever 84, the proximity sensor informs computer 11 that anterior and posterior mold segments 12,14 are filly engaged with tool 76 as described above. In response, computer 11 sends a signal back to machine 10 which causes anterior and posterior handling rods 68,70 to rotate about common axis x—x via drive belts 68",70", respectively (FIG. 1).

As seen in FIGS. 14 and 24, a notch 15' is formed in mold top surface 15 and a pin 83 is fixed to and extends downwardly from lever 84, respectively. Notch 15' is formed in top surface 15 directly opposite the ballast axis of mold surface 12'. Rotation of anterior handling rod 68 together with anterior mold section 12 ultimately causes pin 83 to engage notch 15', at which point anterior mold section 12 is at its "home" position. Pin 83 drops into notch 15' together with lever 84, thereby deactivating the proximity sensor which informs computer 11 the anterior mold sections 12 are at their "home" positions.

Figure 16:
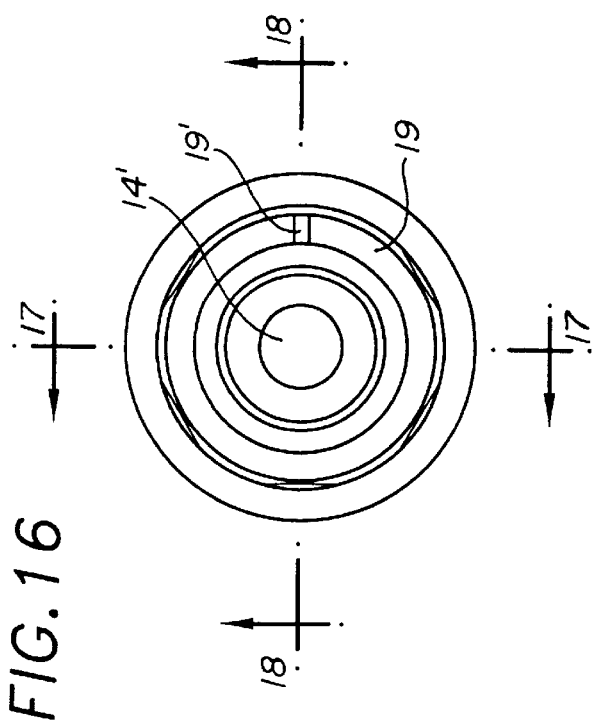
FIG. 16 is a top plan view of FIG. 15.
Figure 23:
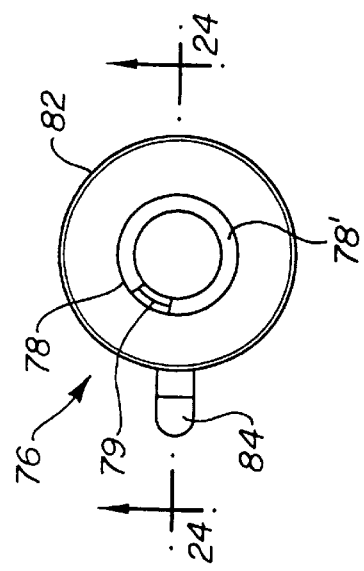
FIG. 23 is a top plan view of FIG. 21.
Figure 21:
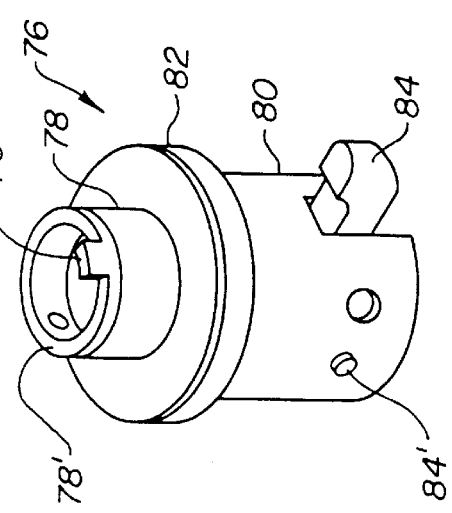
FIG. 21 is a perspective view of the axis alignment tool of the machine.

As seen in FIGS. 16,18, a flange 19' is formed on wall 19 of posterior mold section 14 directly opposite the toric axis of mold surface 14' thereof. As seen in FIGS. 21, 23 and 24, a tab 79 is formed on the upper edge 78' of tool upper segment 78. With posterior mold section 14 engaged with tool upper segment 78, rotation of posterior handling rod 70 together with posterior mold section 14 causes flange 19' on mold section 14 to strike and abut tab 79 on tool upper segment 78. This establishes posterior mold segment 14 at its "home" position.

Anterior handling rod 68 is rotated a distance sufficient to ensure pin 83 will drop into notch 15', preferably, this is a distance greater than 360 degrees. Both the anterior and posterior handling rods 68,70 stop rotating at about the same time. Since the stopping of the rotational movement of the handling rods is not instantaneous and may go beyond the engagement positions of the mold sections with the tool 76, the degree of frictional force between the mold sections and their respective handling rods is made such that any continued rotation of the handling rods will be independent of the mold sections which are now rotationally stationary due to their respective engagement with the axis alignment tool 76. In other words, the static frictional force between the mold sections 12,14 and their respective handling rods 68,70 is strong enough to cause the mold sections 12,14 to rotate with the respective handling rod 68,70 until the mold sections 12,14 engage with the alignment tool 76, at which time this static friction is converted to dynamic friction.

Other frictional interfaces of concern are between the mold sections 12,14 and the alignment tool 76 itself. As handling rods 68,70 begin to rotate, mold sections 12,14 need to be able to rotate freely on the respective bottom and upper segments 80,79 of tool 76 until pin 83 drops into notch 15' and flange 19' strikes tab 79, respectively. To reduce friction at the anterior mold/tool interface, three dowels 85 are provided in annularly spaced relation about diameter $d_2$ of tool 76 (FIGS. 22,24), against which the top surface 15' of anterior mold 12 rides when handling rod 68 begins to rotate. The frictional force at the posterior mold/tool interface is controlled by the amount of vacuum pressure applied through line V.

As discussed above, notch 15' of anterior mold section 12 is formed directly opposite (180 degrees) the ballast axis of the mold surface 12', and flange 19' of posterior mold section 14 is formed directly opposite (180 degrees) the toric axis of the mold surface 14'. As such, with the anterior and posterior mold section 12,14 at their "home" positions, the location of the ballast and toric axes of the respective mold surfaces is known.

Figure 6:
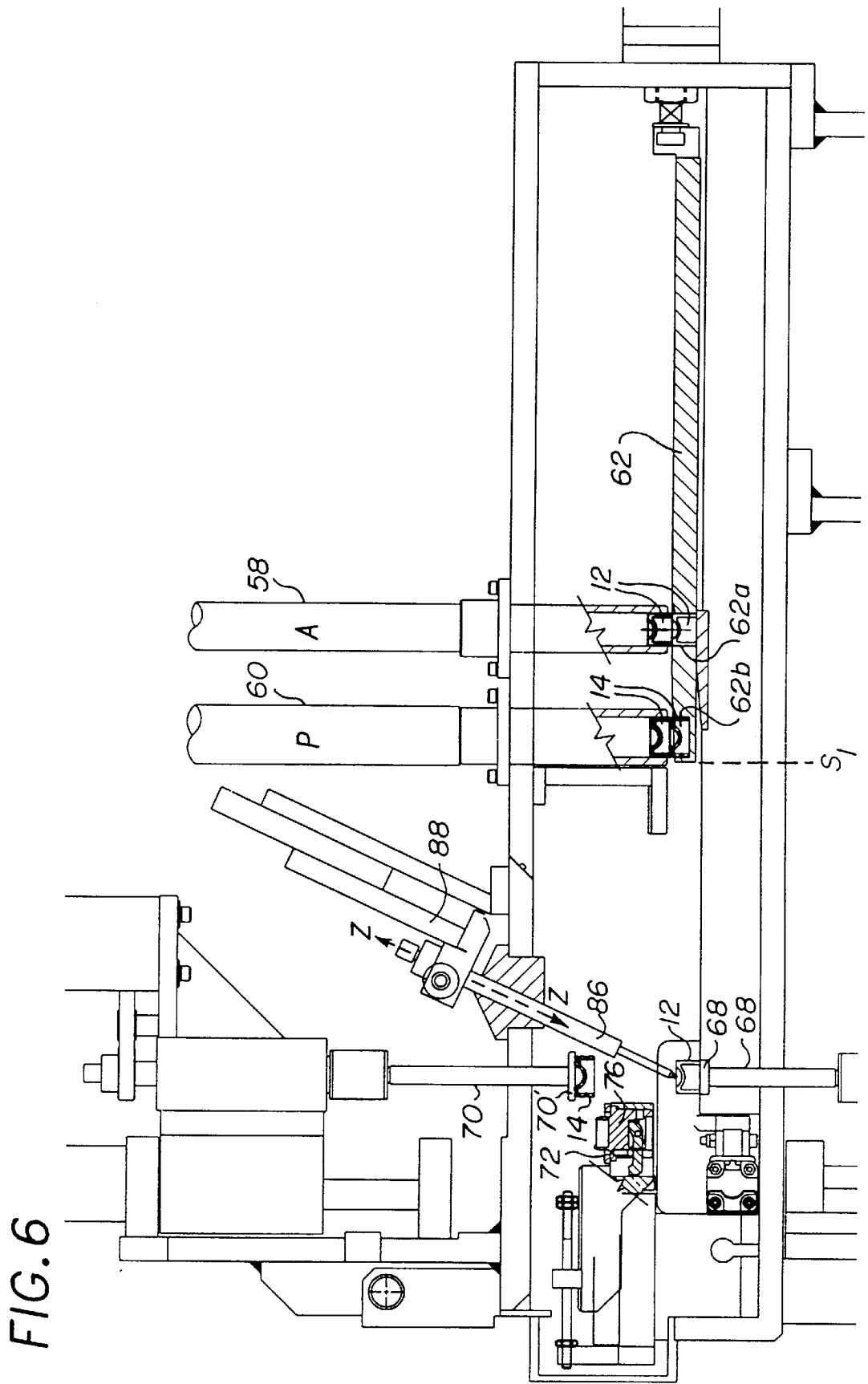
FIG. 6 is a front, elevational view of FIG. 1 showing the machine in a fifth stage of movement.

Referring to FIG. 6, once the anterior and posterior mold sections 12,14 have been rotated to their home positions, the anterior and posterior handling rods 68,70 are lowered and raised, respectively, thereby disengaging the mold sections 12,14 from the alignment tool 76. Once the mold sections are clear of the alignment tool 76, glider plate 72 retracts to the left, back to its home position seen in FIG. 6.

In the preferred embodiment of the invention, to establish the desired axial offset between the toric and ballast axes, the anterior mold section 12 is rotated while the posterior mold section 14 remains stationary, although it is understood either one or both may be rotated to achieve the desired offset. Thus, at this point in the production cycle of machine 10, computer 11 instructs anterior handling rod 68 to rotate itself together with anterior mold section 12 to the predetermined axial offset initially programmed into computer 11. (See also FC8 in FIG. 10). As stated previously, the axial offset may be programmed anywhere from 0 degrees to 180 degrees as required. For example, if toric lenses having an axial offset between the toric and ballast axes of 5 degrees is desired, this is keyed into computer 11 by the operator, and computer 11 will instruct anterior handling rod 68 to rotate 5 degrees at the appropriate time in the production cycle described above.

There may be a small amount of "backlash" in the rotation of anterior handling rod 68, such that the home position of anterior mold section 12 deviates from the desired setting. The backlash may be caused by a light looseness in the drive belt 68', for example. Therefore, in the preferred embodiment of the invention, the home position of the anterior mold section 12 is made 5 degrees minus the home position of the posterior mold section 14. This allows to make up for any backlash by allowing 5 degrees of extra rotation for the anterior mold section 12 to reach the predetermined axial offset. Thus, the home position of the posterior mold section 14 is considered to be 0 degrees and the home position of the anterior mold section 12 is set at 5 degrees negative to the home position of the posterior mold section 14. Thus, to reach an axial offset of 10 degrees, for example, the anterior handling rod 68 rotates the anterior mold section 12 in the clock-wise direction (i.e., toward 0 degrees) by a total 15 degrees if there is no backlash (i.e., if home positions of the posterior and anterior mold sections 12,14 are exactly 5 degrees apart). If there is backlash, for example, the home position of the anterior mold is only 4.5 degrees apart from the home position of the posterior mold section 14, then the anterior handling rod 68 would rotate anterior mold section 12 by a total 14.5 degrees to reach an axial offset of 10 degrees, thereby compensating for the backlash.

Referring still to FIG. 6, once anterior mold section 12 has been rotated to the correct axial offset, a predetermined quantity of liquid monomer is injected into anterior mold section 12 via a monomer injection syringe 86. (See also FC9 in FIG. 10). Syringe 86 is movable along an axis z—z via a pneumatic control assembly 88. Thus, syringe 86 is movable, via signals received from computer 11, from its home (out-of-the-way) position seen in FIGS. 1 and 3–5 when not in use, to the extended position seen in FIG. 6 when injecting the monomer into the mold section 12. Once the monomer has been injected into the mold section, the computer sends a signal instructing syringe 86 to retract to its home position. FIG. 1 shows the monomer station 90 which delivers the correct amount of liquid monomer through lines 92a–c to each of the three syringes 86 for filling each of the three anterior mold sections 12 at this time.

Figure 7:
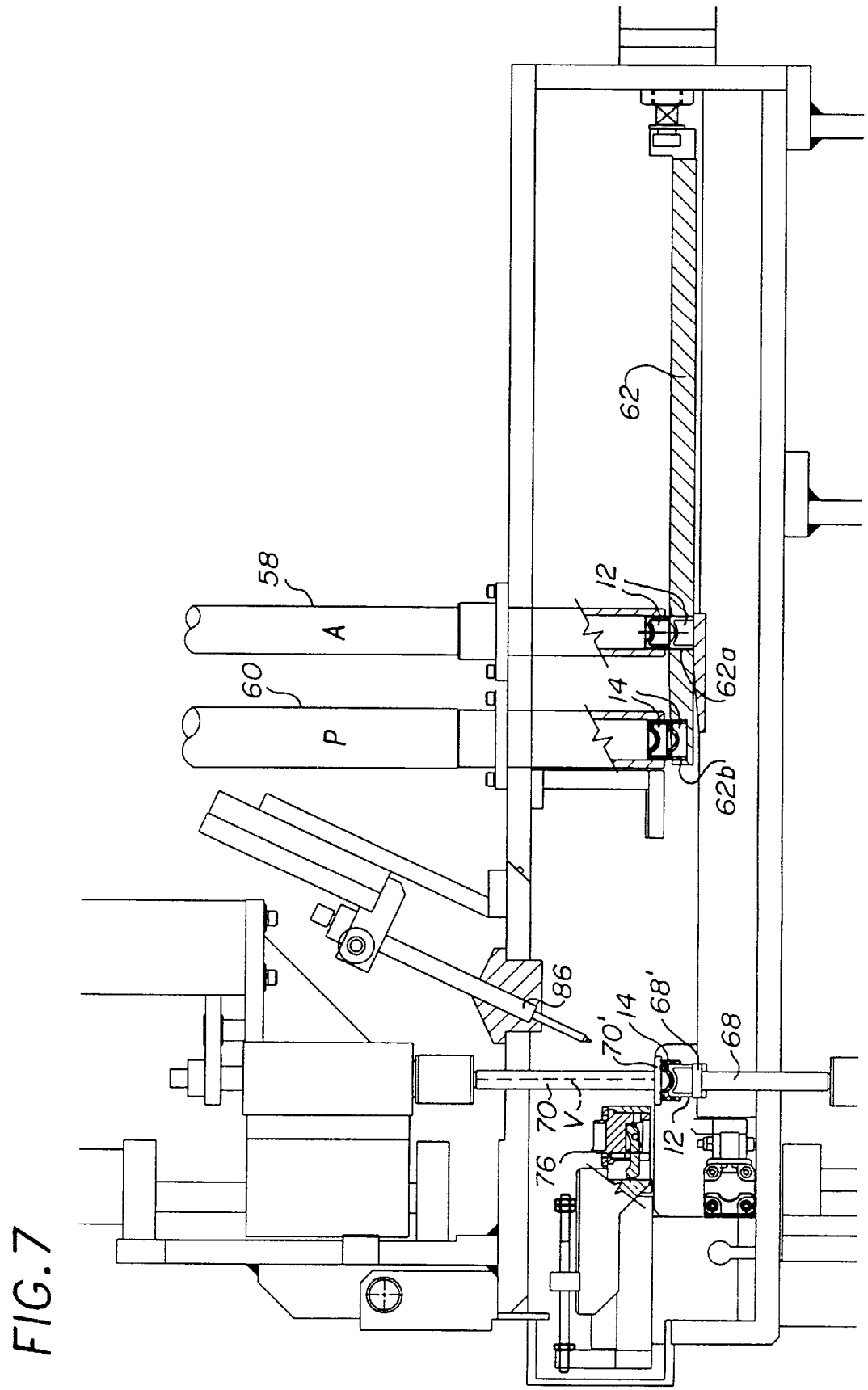
FIG. 7 is a front, elevational view of FIG. 1 showing the machine in a sixth stage of movement.
Figure 8:
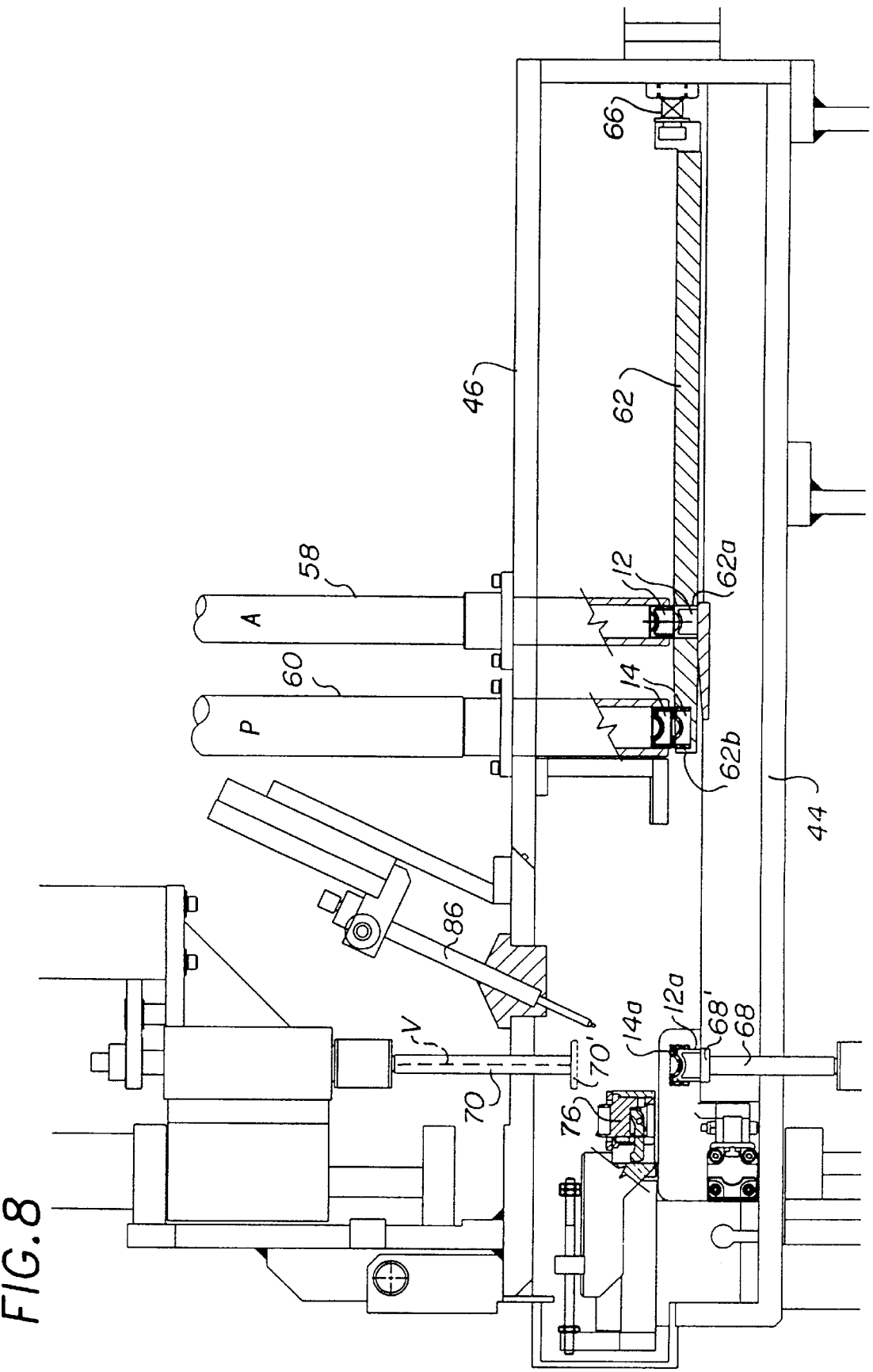
FIG. 8 is a front, elevational view of FIG. 1 showing the machine in a seventh stage of movement.

Referring now to FIGS. 7 and 8, monomer has been injected into the anterior mold sections 12 and syringe 86 has retracted to its home position. The posterior mold section 14 is now ready to be capped to the anterior mold section 12. As described in detail above, the anterior and posterior mold sections 12,14 are at this point at the correct axial offset regarding the toric and ballast axes thereof. There is therefore no further rotation of either the anterior or posterior mold sections 12,14a. Thus, posterior handling rod 70 is now lowered and anterior handling rod 68 is raised until posterior mold section 14 carried thereby engages the respective anterior mold section 12. (See also FC10 in FIG. 11). The clamping force of the posterior mold section 14 on anterior mold section 12 is predetermined and precisely controlled by anterior handling rod 68. Once the appropriate clamping force has been achieved, the vacuum line V in rod 70 is released and handling rod 70 is raised (FIG. 8), and anterior handling rod 68 is lowered, leaving the now capped mold sections 12,14 on anterior handling rod upper surface 68'. (See also FC11 in FIG. 11). As seen in FIG. 2A, a pusher arm 92 is provided which is signaled at this time by computer 11 to extend in the direction of arrow 92' a distance sufficient to push the three capped mold sets 14,16a–c out of housing 40 and onto a UV curing table 94 in the positions labeled 12,14a'–c', where the mold sections are clamped with an external pressure during curing. (See also FC12 in FIG. 11). A gate 96 may optionally be provided to maintain isolation between the UV cure table 94 and machine housing 40, each of which may be provided with different atmospheric environments, if desired. Once the monomer has cured, the mold is de-capped and the molded toric lens is released from the mold. Further processing steps may be performed as desired (e.g., polishing, edging, packaging) in any known manner.

The above describes a single production cycle of machine 10. Subsequent production cycles may be run continuously. As seen best in FIGS. 5 and 6, when anterior handling rod 68 is raised to engage anterior mold section 12 in tool 76, glider plate 62 retracts to its home or "first stop" position $S_1$. This is possible due to the open channels 61 (FIG. 2B) bridging anterior mold openings 62a,c and e, with posterior mold openings 62b,d and f in plate 62, wherethrough anterior rod 68 passes when plate 62 is retracted. Thus, in step FC6, plate 62 has already retracted and has been re-loaded with anterior and posterior mold sections 12,14 in openings 62a,c,e and 62b,d,f thereof, respectively. Thus, once the capped mold sets 12,14a–c have been moved to UV cure table 94, plate 62 is in position and ready to extend to position $S_2$ to begin the next production cycle.

What is claimed is:

1. A method for molding toric contact lenses having opposite anterior and posterior optical surfaces, said toric lenses further including a toric axis and a ballast axis formed on said opposite optical surfaces thereof, respectively, including automatically and selectively establishing any one of a plurality of predetermined axial offsets, between 0 degrees and 180 degrees, between said toric axis and said ballast axis of said lenses, said method comprising the steps of:

a) providing anterior and posterior mold sections having anterior and posterior mold surfaces, respectively, said toric axis formed on one of said anterior and posterior molding surfaces, and said ballast axis formed on the other of said anterior and posterior mold surfaces, said anterior and posterior mold surfaces forming said anterior and posterior optical surfaces of said lenses, respectively;

b) providing a detectable feature on each of said anterior and posterior mold sections at a predetermined angular location with respect to said toric and ballast axes thereof, respectively;

c) providing a toric axis alignment tool having bottom and top sections and including means for detecting and locating said detectable features on each of said anterior and posterior mold sections at known angular positions upon engaging said anterior and posterior mold sections with said bottom and top sections of said axis alignment tool, respectively, and simultaneously rotating said anterior and posterior mold sections relative to said toric axis alignment tool;

d) releasing said anterior and posterior mold sections from said axis alignment tool while maintaining said known angular positions of said anterior and posterior mold sections;

e) rotating at least one of said anterior and posterior mold sections to establish said predetermined axial offset between said toric axis and said ballast axis;

f) charging said anterior mold section with a predetermined quantity of liquid lens material;

g) capping said posterior mold section on said anterior mold section with a predetermined clamping pressure, thereby forming a mold chamber between said anterior and posterior mold surfaces; and h) curing said liquid lens material in said mold chamber, thereby forming said toric lens having said toric and ballast axes formed on said opposite optical surfaces thereof at said predetermined axial offset.

2. The method of claim 1 wherein said axis alignment tool includes a tab and a pin in said top and bottom sections thereof, respectively, for engaging said detectable features comprising a flange and a notch on said anterior and posterior mold sections, respectively.

3. The method of claim 1 wherein said toric axis is formed on said posterior mold surface, and said ballast axis is formed on said anterior mold surface.

4. The method of claim 1 wherein one of said detectable features is a notch, and said detecting means is a pin for engaging said notch.

5. The method of claim 4 wherein said notch is formed on said anterior mold section.

6. The method of claim 1 wherein one of said detectable features is a flange, and said detecting means is a tab for engaging said flange.

7. The method of claim 6 wherein said flange is formed on said posterior mold section.

8. The method of claim 1 wherein said known angular positions of said detectable features of said anterior and posterior mold sections are coincident.

9. The method of claim 1 wherein said known angular position of one of said detectable features is minus five degrees of said known angular position of the other of said detectable features.

10. The method of claim 1 wherein in step 1(e), said anterior mold section is rotated relative to said posterior mold section.

11. The method of claim 1, and further providing a means for inputting said predetermined angular offset, said input means controlling the rotation of said one of said anterior and posterior mold section 1(e), and wherein said angular offset as entered into said input means may be changed from one production cycle of said toric contact lenses to the next.

12. The method of claim 11 wherein said input means is a computer.

13. Apparatus for automatically molding toric contact lenses having opposite anterior and posterior optical surfaces with one of said optical surfaces having a toric axis and the other of said optical surfaces having a ballast axis, said apparatus comprising:

a) an anterior mold section having an anterior mold surface for molding said anterior optical surface of said lenses, said anterior mold section having a detectable feature positioned at a predetermined location on said anterior mold section relative to said one of said toric axis and ballast axis thereof;

b) a posterior mold section having a posterior mold surface for molding said posterior optical face of said lens, said posterior mold section having a detectable feature positioned at a predetermined location on said posterior mold relative to said one of said ballast axis and toric axis thereof;

c) means for detecting and positioning said detectable features of each of said anterior and posterior mold sections at a predetermined angular location with respect to each other, said means comprising an axis alignment tool having top and bottom sections each having a said detecting means, and wherein said posterior mold section is engagable with and rotatable with respect to said top section thereof, and said anterior mold section is engagable with and rotatable with respect to said bottom section thereof whereby said axis alignment tool is operable to simultaneously position said posterior and anterior mold sections at said predetermined angular locations;

d) input means for selecting a predetermined angular offset between said ballast axis and said toric axis of said anterior and posterior mold sections through at least one production run of said toric lenses, said predetermined angular offset capable of being selectively changed between production runs;

e) means for rotating at least one of said anterior and posterior mold sections, in response to a signal received from said input means, until said ballast axis and said toric axis of said anterior and posterior mold sections are at said predetermined angular offset;

f) means for depositing a measured quantity of liquid lens material into said anterior mold surface;

g) means for capping said posterior and anterior mold sections together to form a mold cavity wherein said liquid mold material is located; and h) means for curing said liquid lens material into a said toric lens.

14. The apparatus of claim 13 wherein said predetermined angular offset is an angle between 0 degrees and 180 degrees inclusive.

15. The apparatus of claim 13 wherein said input means is a computer connected to said apparatus.

16. The apparatus of claim 13 wherein said rotating means is a handling rod having an upper surface.

17. The apparatus of claim 16 wherein said handling rod is an anterior mold section handling rod, and wherein said anterior mold section is positioned on said upper surface during said rotation thereof.

18. The apparatus of claim 13 wherein said detectable features comprises a notch and a tab, and said detecting means comprises a pin and a flange for engaging said notch and said tab on said mold sections, respectively.

* * * * *